United States Patent
Redman et al.

[11] Patent Number: 5,947,518
[45] Date of Patent: Sep. 7, 1999

[54] BRACKET WITH FLOATING TAP PLATE FOR CONNECTING VEHICLE SUSPENSION TO BODY

[75] Inventors: Forrest C. Redman, Lapeer; Max A. Corporon, Bloomfield Hills; Larry E. Nelson, Bingham Farms, all of Mich.

[73] Assignees: DaimlerChrysler Corporation, Auburn Hills, Mich.; Deluxe Stamping and Die Company, Sterling Heights, Mich.

[21] Appl. No.: 08/678,285

[22] Filed: Jul. 11, 1996

[51] Int. Cl.$^6$ ................................................. B62D 21/00
[52] U.S. Cl. ........................... 280/781; 280/800; 411/104
[58] Field of Search .................................. 280/800, 673, 280/781, 788, 785; 411/104, 84, 85, 112, 113, 111; 296/29, 30, 204

[56] References Cited

U.S. PATENT DOCUMENTS

| | | | |
|---|---|---|---|
| 2,429,833 | 10/1947 | Luce | 411/84 |
| 3,534,977 | 10/1970 | Wessel | 280/106 |
| 4,486,029 | 12/1984 | Raidel | 280/682 |
| 4,875,816 | 10/1989 | Peterson | 411/85 |
| 4,943,092 | 7/1990 | Haraguchi | 280/660 |
| 4,953,891 | 9/1990 | Zantinge | 280/788 |
| 5,005,864 | 4/1991 | Chachere | 280/800 |
| 5,085,484 | 2/1992 | Mori | 196/204 |
| 5,169,171 | 12/1992 | Ban et al. | 280/688 |
| 5,193,643 | 3/1993 | McIntyre | 411/104 |
| 5,286,052 | 2/1994 | Lukianov | 280/675 |
| 5,308,115 | 5/1994 | Ruehl et al. | 280/785 |
| 5,344,187 | 9/1994 | Kreis et al. | 280/788 |
| 5,558,369 | 9/1996 | Cornea et al. | 280/800 |

FOREIGN PATENT DOCUMENTS

| | | | |
|---|---|---|---|
| 4-90975 | 3/1992 | Japan | 280/788 |

*Primary Examiner*—Eric D. Culbreth
*Attorney, Agent, or Firm*—James R. Yee

[57] ABSTRACT

A bracket includes a hollow base that can be welded to a frame rail of a vehicle. The base includes opposing U-shaped retainer arms that face each other and that define a bolt passageway therebetween. A plate including an internally tapped cylinder having a diameter less than the bolt passageway is disposed in the base between the arms, with the tapped cylinder positioned in the bolt passageway and the plate floatingly retained between the arms. With this combination of structure, the plate can move in the base. Consequently, a bolt can be engaged with a component of the rear suspension of the vehicle and advanced into the bolt passageway, and then the plate with cylinder moved as necessary to threadably engage the bolt to couple the suspension to the frame rail while absorbing minor manufacturing tolerance variations.

12 Claims, 2 Drawing Sheets

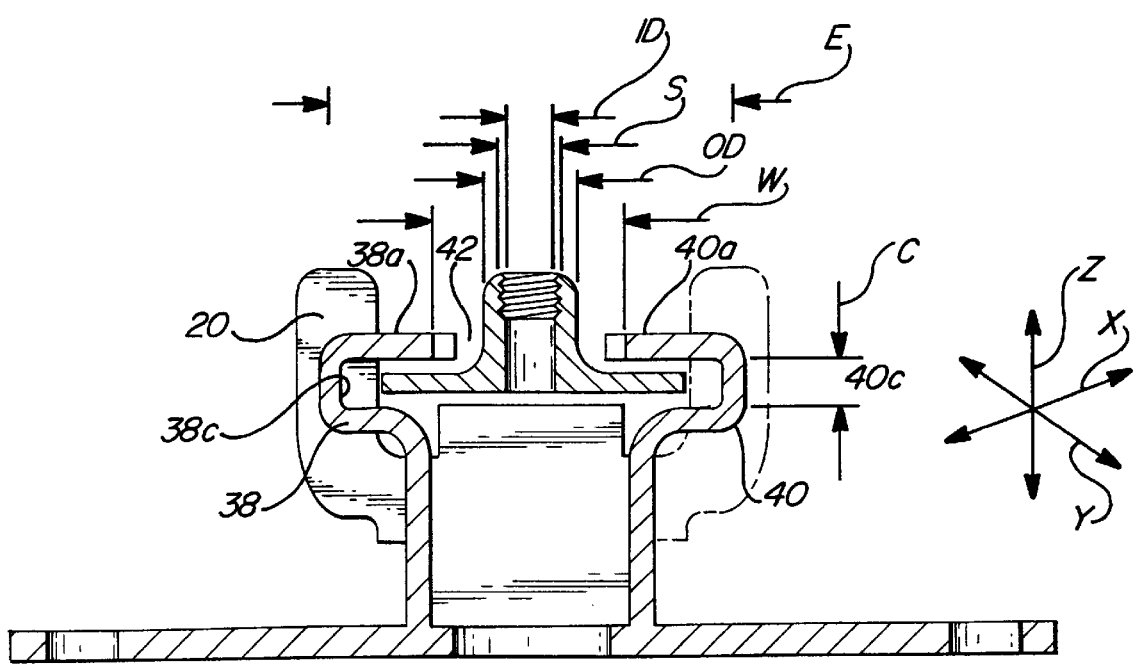

BRACKET WITH FLOATING TAP PLATE FOR CONNECTING VEHICLE SUSPENSION TO BODY

FIELD OF INVENTION

The present invention relates generally to vehicle suspensions, and more particularly to methods and apparatus for connecting a vehicle's rear suspension to the vehicle's body.

BACKGROUND OF THE INVENTION

The rear suspension of a vehicle is typically coupled to longitudinally-oriented frame rails of the vehicle. Ordinarily, the rear suspension is connected to the frame by advancing one or more bolts upwardly through clearance holes in spacers of isolator rubber mounts of the rear suspension and then engaging the bolts with respective threaded receptacles that are welded to the frame.

It happens that variations in manufacturing tolerances can complicate aligning the holes of the various components to permit the bolt to be advanced through the holes and into the associated receptacle. For this reason, the clearance holes in the isolator mount spacers are sometimes configured to be significantly larger than the bolt diameter, to absorb minor manufacturing tolerance variations. Unfortunately, an undesirable consequence of enlarged clearance holes is that the bolt might slip within the hole, relative to the spacer, thereby reducing the desired isolation of the suspension. As recognized herein, however, it is possible to absorb minor manufacturing tolerances and thereby simplify coupling a vehicle rear suspension to the frame, without enlarging clearance holes in suspension components.

Accordingly, it is an object of the present invention to provide a bracket for connecting a rear suspension component of a vehicle to the frame of the vehicle while absorbing minor manufacturing tolerance variations. Another object of the present invention is to provide a bracket for connecting a rear suspension component of a vehicle to the frame of the vehicle that optimizes the isolation of the rear suspension. Yet another object of the present invention is to provide a bracket for connecting a rear suspension component of a vehicle to the frame of the vehicle that reinforces the frame of the vehicle. Still another object of the present invention is to provide a bracket for connecting a rear suspension component of a vehicle to the frame of the vehicle which is easy to use and cost-effective to manufacture.

SUMMARY OF THE INVENTION

A bracket is disclosed for engaging a bolt to connect a frame of a vehicle to a suspension of the vehicle. The bracket includes a base that has at least one attachment surface weldable to the frame. Also, the base includes a retainer, and the retainer is formed with opposed spaced apart retainer arms. Per the present invention, each arm is characterized by a U-shaped cross-section, and the arms establish a bolt passageway therebetween that defines a first diameter. A tap plate is floatingly disposed in the retainer, with the tap plate including an internally threaded hollow tap cylinder for receiving the bolt. The tap cylinder is disposed in the bolt passageway and defines a second diameter less than the first, such that the tap plate can move translationally in the retainer in at least two dimensions when the bolt is not engaged with the tap cylinder.

In a preferred embodiment, the tap plate defines a thickness and each U-shaped retainer arm defines a space greater than the thickness, to permit relative motion between the tap plate and retainer. Desirably, the tap cylinder defines an outer diameter and each retainer arm is formed with a respective curved upper surface partially defining the bolt passageway, with the minimum distance between the upper surfaces of the opposed retainer arms being less than the outer diameter of the tap cylinder. Consequently, the tap cylinder can move inside the bolt passageway while being retained therein by the retainer arms.

Moreover, in one preferred embodiment each retainer arm includes a vertical wall that is perpendicular to the respective upper surface of the arm. The walls define a retainer distance therebetween, and the tap plate defines a diagonal distance that is less than the retainer distance.

In another aspect, the bracket is disclosed in combination with the bolt and the vehicle.

In another aspect of the present invention, a bracket assembly for engaging a bolt includes a base including a retainer. A receptacle is threadably engageable with the bolt, and the receptacle is floatingly disposed in the retainer and retained therein for motion relative thereto in at least two dimensions when not engaged with the bolt.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a cross-sectional view of the assembled bracket as would be seen along the line 2—2 in FIG. 1.

DETAILED DESCRIPTION OF THE PREFERRED EMBODIMENT

Figure 1:
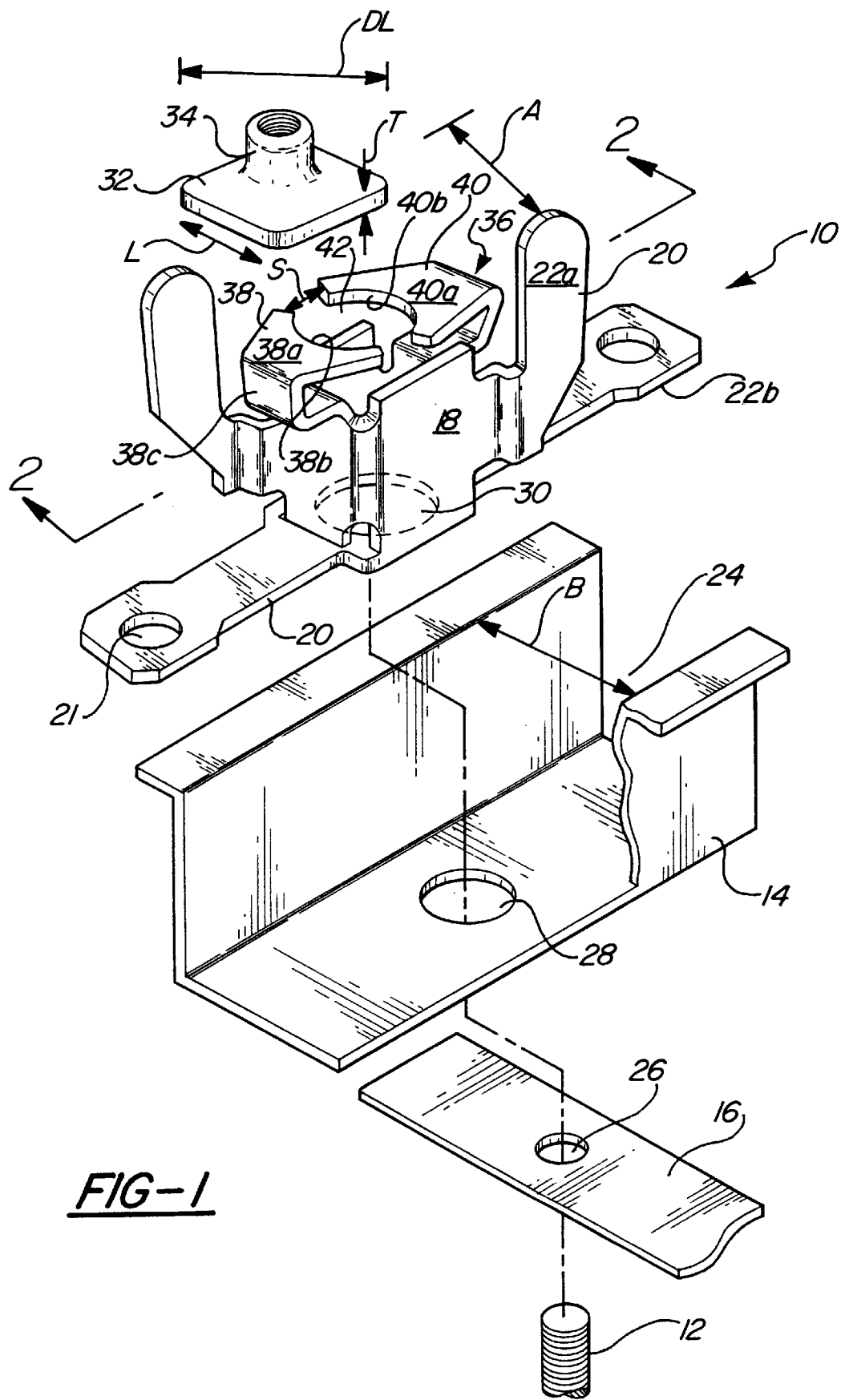
FIG. 1 is an exploded perspective view of the bracket of the present invention, shown in an exploded relationship with a longitudinal rear rail of a vehicle frame, a rear suspension cross-member, and a connecting bolt, showing the bottom hole of the pedestal in phantom.

Referring initially to FIG. 1, a steel or aluminum bracket, generally designated 10, is shown for engaging a bolt 12 to connect a longitudinal frame rail 14 of a vehicle to a spacer 16. In accordance with well-known principles, the spacer 16 is molded into a rubber isolation mount (not shown) of the rear suspension of the vehicle. In other words, the spacer 16 is part of the rear suspension system of the vehicle, and by coupling the spacer 16 with the rail 14, the rear suspension of the vehicle is coupled to the frame of the vehicle. It is to be understood that while FIG. 1 shows a single bracket 10, in one presently preferred embodiment four brackets are used to interconnect the rear suspension and the vehicle frame.

FIG. 1 shows that the bracket 10 includes a hollow, generally parallelepiped-shaped base 18 which is formed with four flat attachment wings 20. If desired, one or more of the wings 20 can be formed with a locating hole 21.

Additionally, each attachment wing 20 defines a respective attachment surface 22a or 22b. More specifically, two of the wings 20 define vertical attachment surfaces 22a and two of the wings 20 define horizontal attachment surfaces 22b, with the vertical attachment surfaces 22a being parallel to each other as shown and perpendicular to the horizontal attachment surfaces 22b.

The frame rail 14 forms a channel 24 as shown, and as the skilled artisan will appreciate, the bracket 10 is positioned in the channel 24 and then one or more of the attachment surfaces 22 are welded to the rail 14 to affix the bracket 10 to the rail 14. Advantageously, the distance "A" between the vertical attachment surfaces 22a is substantially equal to the width "B" of the channel 24. With this combination of structure, the bracket 10 reinforces the rail 14.

FIG. 1 further shows that the spacer 16 is formed with a clearance hole 26, the diameter of which is marginally larger than the diameter of the bolt 12. Accordingly, the bolt 12 substantially cannot move side-to-side within the clearance hole 26 of the spacer 16. Consequently, undesirable slippage between the bolt 12 and the rear suspension of the vehicle is minimized.

In contrast to the spacer 16 of the rear suspension, the frame rail 14 is formed with a clearance hole 28 that is substantially larger than the diameter of the bolt 12. Likewise, the body 18 of the bracket 10 is formed with a clearance hole 30 (shown in phantom in FIG. 1) that has a diameter substantially larger than the diameter of the bolt 12. Accordingly, the spacer 16 can be positioned against the frame rail 14 with the bolt 12 extending upwardly through the clearance holes 26, 28, 30. It will be appreciated from the above discussion that owing the relatively large clearance holes 28, 30 of the rail 14 and the bracket 10, the position of the spacer 16 relative to the rail 14 can be adjusted somewhat as necessary to align the bolt 12 with the clearance holes.

To engage the bolt 12, the bracket 10 includes a bolt receptacle that can move relative to the body 18 of the bracket 10 as necessary to align the bolt 12 with the receptacle, thereby absorbing variations in manufacturing tolerances. In the presently preferred embodiment, the receptacle is established by a flat, generally square tap plate 32 which is integrally formed with an internally threaded tap cylinder 34. As shown best in FIG. 2, the cylinder 34 defines an outer diameter "OD" and an inner diameter "ID", with the inner diameter "ID" being established to be substantially equal to the diameter of the bolt 12, for facilitating threadable engagement thereof.

Further details of the bracket 10 can be seen in cross-reference to FIGS. 1 and 2. As shown, the base 18 includes a retainer 36 that is formed with opposed spaced apart retainer arms 38, 40. As further shown, each arm 38, 40 is characterized by a U-shaped cross-section, thereby establishing a space across each "U" having a width "C" (FIG. 2).

Also, each arm 38, 40 defines a respective upper surface 38a, 40a, and as best shown in FIG. 1, each upper surface 38a, 40a is formed with a respective curved edge 38b, 40b. As shown, the curved edges 38b, 40b of the arms 38, 40 are opposed to each other, such that together they establish a bolt passageway 42 having a diameter "W" (FIG. 2). In accordance with the present invention, the diameter "W" of the bolt passageway 42 is about equal to the diameter of the clearance holes 28, 30 in the rail 14 and body 18. Also, each retainer arm 38, 40 includes a respective vertical wall 38c, 40c, with the walls 38c, 40c being spaced apart by a distance "E".

Furthermore, as shown in FIG. 1, owing to the spaced apart curved edges 38b, 40b, a minimum distance "S" is established between the upper surfaces 38a, 40a of the opposed retainer arms 38, 40. Per the present invention, to retain the tap cylinder 34 within the retainer 36, this minimum distance "S" is less than the outer diameter "OD" of the tap cylinder 34. With this cooperation of structure, it will be appreciated that when the bolt 12 is not engaged with the tap cylinder 34, the tap cylinder 34 can move inside the bolt passageway 42 while being retained therein by the retainer arms 38, 40.

With particular regard to the tap plate 32, the tap plate 32 defines a thickness "T", a side length "L", and a diagonal "DL". As intended by the present invention, the thickness "T" (FIG. 1) of the tap plate 32 is several millimeters less than the width "C" (FIG. 2) of each retainer arm 38, 40. Also, the side length "L" (FIG. 1) of the tap plate 32 is several millimeters less than the distance "E" (FIG. 2) between the vertical walls 38c, 40c of the retainer arms 38, 40. In contrast, the diagonal "DL" (FIG. 1) of the tap plate 32 is greater than the distance "E" between the vertical walls 38c, 40c of the retainer arms 38, 40. Consequently, the tap plate 32 can rotate relative to the retainer arms 38, 40, but it cannot completely rotate through 360°.

With the above disclosure in mind, it may now be appreciated that the tap plate 32 is floatingly retained in the retainer of the present invention. Stated differently, the tap plate 32 can move translationally in the retainer in the three spatial dimensions indicated by the double arrows "X", "Y", and "Z", when the bolt 12 is not engaged with the tap cylinder 34. The tap plate 32 with tap cylinder 34 is nevertheless retained by the retainer arms 38, 40. Consequently, the tap plate 32 with tap cylinder 34 can be moved somewhat within the body 18 of the bracket 10 as necessary to engage the bolt 12. Owing to this cooperation of structure, bracket 10 of the present invention can absorb manufacturing tolerance variations to permit the rear suspension of the vehicle to be easily and conveniently connected to the frame of the vehicle.

While the particular BRACKET WITH FLOATING TAP PLATE FOR CONNECTING VEHICLE SUSPENSION TO BODY as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A bracket for use with a bolt to connect first and second components of a vehicle, comprising:

a base including at least one attachment surface attachable to the first component, the base also including a retainer spaced from said at least one attachment surface, the retainer being formed with opposed spaced apart retainer arms, each arm being characterized by a U-shaped cross-section, the arms establishing a bolt passageway therebetween defining a first diameter; and a tap plate floatingly disposed in the retainer and spaced from said at least one attachment surface, the tap plate including an internally threaded hollow tap cylinder for receiving the bolt, the tap cylinder being disposed in the bolt passageway and defining a second diameter less than the first, whereby the tap plate can move translationally in the retainer in at least two dimensions when the bolt is not engaged with the tap cylinder.

2. The bracket of claim 1, wherein the tap plate defines a thickness and each U-shaped retainer arm defines a space greater than the thickness, to permit relative motion between the tap plate and retainer.

3. The bracket of claim 2, wherein the tap cylinder defines an outer diameter and wherein each retainer arm is formed with a respective curved upper surface partially defining the bolt passageway, with the minimum distance between the upper surfaces of the opposed retainer arms being less than the outer diameter of the tap cylinder, such that the tap cylinder can move inside the bolt passageway while being retained therein by the retainer arms.

4. The bracket of claim 3, wherein each retainer arm includes a vertical wall perpendicular to the respective upper surface of the arm, with the walls defining a retainer distance therebetween, and wherein the tap plate defines a diagonal distance less than the retainer distance.

5. The bracket of claim 4, in combination with the bolt.

6. The combination of claim 5, further in combination with the vehicle.

7. The bracket of claim 1, wherein said attachment surface is oriented substantially perpendicular to a longitudinal axis of the bolt.

8. A vehicle, comprising:

a rear suspension;

a plurality of longitudinal frame rails; and a plurality of bracket assemblies coupling the frame rails to the rear suspension, each bracket assembly comprising:

a bolt;

a base including at least one attachment surface welded to one of the rails, the base also including a retainer spaced apart from said at least one attachment surface, the retainer being formed with opposed spaced apart retainer arms, each arm being characterized by a U-shaped cross-section, the arms establishing a bolt passageway therebetween defining a first diameter; and a tap plate floatingly disposed in the retainer and spaced apart from said at least one attachment surface, the tap plate including an internally threaded hollow tap cylinder for receiving the bolt with a portion of the rear suspension positioned between the bolt and the base, the tap cylinder being disposed in the bolt passageway and defining a second diameter less than the first, whereby the tap plate can move translationally in the retainer in at least two dimensions when the bolt is not engaged with the tap cylinder.

9. The vehicle of claim 8, wherein each tap plate defines a thickness and each U-shaped retainer arm defines a space greater than the thickness, to permit relative motion between the tap plate and retainer.

10. The vehicle of claim 8, wherein each tap cylinder defines an outer diameter and wherein each retainer arm is formed with a respective curved upper surface partially defining the bolt passageway, with the minimum distance between the upper surfaces of the opposed retainer arms being less than the outer diameter of the tap cylinder, such that the tap cylinder can move inside the bolt passageway while being retained therein by the retainer arms.

11. The vehicle of claim 8, wherein each retainer arm includes a vertical wall perpendicular to an upper surface of the arm, with the walls defining a retainer distance therebetween, and wherein the associated tap plate defines a diagonal distance less than the retainer distance.

12. The vehicle of claim 8, wherein said attachment surface is oriented substantially perpendicular to a longitudinal axis of the bolt.

* * * * *

UNITED STATES PATENT AND TRADEMARK OFFICE
CERTIFICATE OF CORRECTION

PATENT NO. : 5,947,518
DATED : September 7, 1999
INVENTOR(S) : Redman et al.

Page 1 of 1

It is certified that error appears in the above-identified patent and that said Letters Patent is hereby corrected as shown below:

Title page,
Item [75] in the Inventors section, please add "Norman B. Robbins, Davison, MI".

Signed and Sealed this

Twenty-eighth Day of August, 2001

*Attest:*

*Nicholas P. Godici*

*Attesting Officer*

NICHOLAS P. GODICI
*Acting Director of the United States Patent and Trademark Office*